Nov. 14, 1939.　　　E. E. BIDWELL　　　2,179,609
SPARK PLUG CONSTRUCTION
Filed Nov. 20, 1937
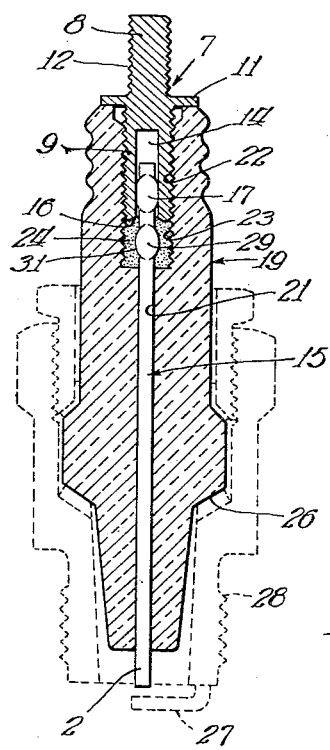
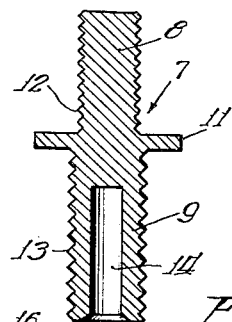
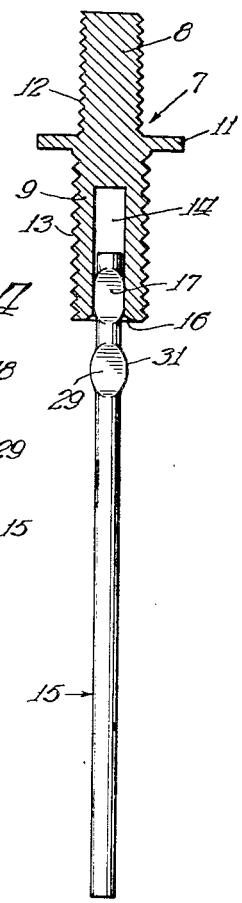
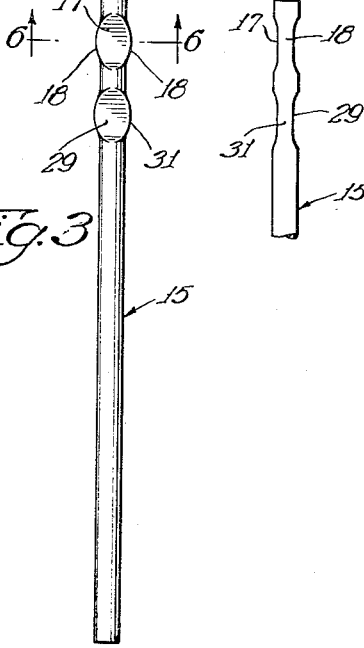
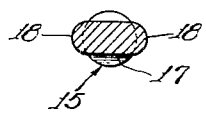
Inventor:
Earl E. Bidwell
By:
Hill & Hill
Attys.
Witness:
V. Siljander Patented Nov. 14, 1939

2,179,609

UNITED STATES PATENT OFFICE 2,179,609

SPARK PLUG CONSTRUCTION

Earl E. Bidwell, Gary, Ind., assignor to Productive Inventions, Inc., Gary, Ind., a corporation of Indiana Application November 20, 1937, Serial No. 175,556

14 Claims. (Cl. 123—169)

This invention relates to spark plugs for internal combustion engines, or the like, and particularly to a novel assembly of the central or positive electrode, the terminal member or screw associated therewith, and the insulating core of the plug.

Heretofore, various means have been employed in spark plug construction for connecting an electrode to its terminal member, as, for example, by welding the electrode to the terminal member, a practice which has not been satisfactory, as the extreme heat, employed in welding, upsets the grain or molecular construction of the materials, and the fusing incidental to welding interposes electrical resistance in the materials, which tends to disable the spark and reduce the efficiency of the plug.

In other constructions, one end of the electrode has been butted against an adjacent end of the terminal member. This, also, is unsatisfactory because of the difficulty in preventing an accidental gap at the butt joint, and because of the tendency of the cement, used to secure the electrode in the porcelain or core of the plug, to force itself in between the electrode and the terminal member, thus adding resistance to the flow of current through the electrode and terminal member.

In the above mentioned and other constructions, considerable expense also has been involved in machining or other operations, to position the exposed end of the electrode in proper relation to the core in order to obtain the desired position of the exposed end of the electrode with respect to the other electrode mounted on the shell when the plug is completely assembled.

One object, therefore, of the present invention is to provide a novel construction and arrangement to facilitate the economical and efficient assembling of the electrode and terminal member of a spark plug.

Another object of the invention is to provide a novel construction and arrangement whereby an efficient electrical contact may be obtained and maintained between the terminal member and central electrode of the plug.

Another object of the invention is to provide novel means for connecting the electrode and terminal member without destroying or restricting the electrical conductivity of the electrode and terminal.

Another object of the invention is to provide a novel construction and arrangement whereby the exposed end of the electrode may be conveniently, economically and effectively located or positioned with respect to the porcelain or insulating core in which the electrode and terminal member are mounted.

A further object of the invention is to provide novel means for maintaining the electrode and exposed end thereof in proper position with respect to the insulating core.

A still further object of the invention is to improve devices of the character described in sundry details hereinafter referred to and particularly pointed out in the appended claims.

One embodiment of the present invention is shown for illustrative purposes in the accompanying drawing, in which:

Fig. 1 is a sectional elevational view of a spark plug porcelain or insulating core illustrating my improved connection between the electrode and terminal member applied thereto, the shell portion of the spark plug and associated parts being shown in dotted lines to illustrate their relation to the electrode and core assembly;

Fig. 2 is an enlarged sectional elevational view of the improved terminal member illustrated in Fig. 1;

Fig. 3 is an enlarged elevational view of my improved electrode shown in relation to the terminal member of Fig. 2, and in position for preliminary assembling therewith;

Fig. 4 is a fragmentary elevational view of an end portion of my improved electrode and taken from a position substantially at right angles to the view shown in Fig. 3;

Fig. 5 is a sectional elevational view of the terminal member and electrode illustrated in Figs. 2 and 3, and showing these elements assembled prior to positioning the elements in final position with relation to each other and to the spark plug core; and Fig. 6 is a further enlarged transverse sectional view of the electrode illustrated in the drawing, and taken substantially as indicated by the line 6—6 of Fig. 3.

In the illustrative embodiment shown in the drawing, the present invention comprises a terminal member or screw indicated, as a whole, by the numeral 7 and comprising an elongated member having outer and inner end portions 8 and 9, respectively, and having a laterally extending flange 11 formed thereon intermediate said end portions, the said end portions being, preferably, screw-threaded as indicated at 12 and 13.

The end portion 9 of the terminal member 7 is provided with an elongated, preferably, circular recess 14 adapted to receive one end portion of an electrode indicated, as a whole, by the numeral 15, the end portion 9 of the member being provided also with a tapered counter-bore 16 to facilitate the insertion of the end of the electrode 15 into the recess 14.

The electrode 15 shown, in the present instance, is, preferably, of circular cross section and of a diameter slightly less than the diameter of the recess 14, and as clearly illustrated in Figs. 3 and 4, is provided adjacent one of its ends with a flattened portion 17 to provide enlargements or projections 18 extending laterally and, preferably, at opposite sides of the electrode, the greatest width at said flattened portion 17, or the distance between the outer edges of the enlargements 18, being slightly greater than the diameter of the recess 14, the enlargements 18 adjacent the flattened portion 17 being adapted to be forced into the recess 14 in a manner to be firmly seated therein and to provide a binding contact with the inner walls of the recess as illustrated in Fig. 5, wherein the end of the electrode is shown as inserted only a portion of the distance to which it will be moved into the recess in the final assembly of the electrode and terminal member.

The assembled electrode 15 and terminal member 7, while in substantially the relative positions shown in Fig. 5 are intended to be inserted in a porcelain or insulating core, indicated, as a whole, by the numeral 19 forming a part of the spark plug structure, the said core having an elongated opening 21 formed therein adapted to receive the electrode 15, and having an elongated threaded socket 22 formed adjacent one end thereof and communicating with the opening 21, the socket 22 being adapted to receive the threaded portion 13 of the terminal member 7 with the flange 11 of the terminal member in engagement with the end of the core 19 in a manner to space the inner end portion of the terminal member from the inner end of the socket 22 to provide a chamber 23 in the core adjacent one end of the elongated opening 21, the socket 22 and opening 21 having previously been charged with a cementitious sealing material 24 for securing and sealing the electrode 15 and terminal member 7 within the core.

For conveniently and properly positioning the exposed end portion of the electrode 15 with respect to the core 19, and particularly with respect to the gasket seat 26 thereof, the electrode, after being positioned within the core 19, and while the cementitious sealing material 24 is still pliable, may be moved farther into the recess 14 of the terminal member 7 to the desired position, thereby providing suitable spacing of the exposed end 25 of the electrode 15 with respect to the other electrode 27 mounted on the shell 28 when the spark plug structure is completely assembled.

For securing the electrode 15 in desired or fixed position, and against accidental displacement with respect to the core 19, after the cementitious sealing material 24 in the chamber 23 has hardened and set, the electrode is provided with a second flattened portion 20 providing laterally extending projections or enlargements 31 on opposite sides of the electrode, which, if desired, may provide a greater width than at the enlargements 18, and adapted to be positioned in the chamber 23 in a manner to be embedded in the cementitious material 24 therein, thereby providing efficient and adequate means for retaining the electrode in relatively fixed position with respect to the core.

It will be observed from the foregoing description that in assembling the electrode 15 and terminal member 7, by forcing the enlargements 18 of the electrode into the recess 14 of the terminal, an efficient electrical contact is provided between these elements and that upon positioning the assembled electrode and terminal in the core 19, while the sealing material 24 in the chamber 23 is in plastic or pliable condition, the electrode may be inserted farther into the recess 14 for properly positioning the exposed end portion 15 of the electrode with respect to the core, and that by reason of the flattened portion 29 and enlargements 31 positioned in the chamber and embedded in the cementitious material 24, the electrode will be securely retained in desired position with respect to the core.

It will be observed also from the foregoing description that the present invention provides a novel construction and arrangement wherein an efficient electrical contact may be obtained and maintained between the terminal member and central electrode of a plug, and wherein such electrical contact is obtained without destroying or restricting the electrical conductivity of these elements.

Furthermore, the present invention provides a novel construction and arrangement whereby the exposed end portion of the electrode may be conveniently, economically, and effectively located or positioned with respect to the insulating core of the spark plug, and wherein the electrode may be maintained in relatively fixed position with respect to the core.

Obviously, the present invention is not limited to the precise construction and arrangement shown and described, as the same may be variously modified. Moreover, all the features of the invention need not be used conjointly as the same may be used to advantage in variously different combinations and sub-combinations.

What I claim as new and desire to secure by Letters Patent is:

1. In an article of the class described, and in combination, a terminal member having a recess formed therein, and an electrode of substantially uniform and slightly less diameter than the diameter of said recess and having an enlarged portion adjacent one of its ends of a width slightly greater than the diameter of the recess and adapted to be forced into said recess to provide a binding electrical contact with the walls thereof.

2. In an article of the class described, and in combination, a terminal member having a recess formed therein and a one piece electrode of substantially uniform and slightly less diameter than the diameter of said recess and having an enlarged portion adjacent and spaced from one of its ends, said enlarged portion having a width slightly greater than the diameter of the recess and adapted to be forced into said recess to provide a binding electrical contact with the walls thereof.

3. In an article of the class described and in combination, a terminal member having a recess formed therein, and an electrode of slightly less diameter than the diameter of said recess and having a flattened portion adjacent and spaced from one of its ends providing enlargements at the sides of the electrode, said flattened portion having a width slightly greater than the diameter of the recess and adapted to be forced into said recess to provide a binding electrical contact with the walls thereof.

4. In an article of the class described and in combination, a terminal screw having an elongated recess formed therein and having a counter-bore adjacent the open end of said recess, and an electrode of slightly less diameter than the diameter of said recess and having a flattened portion adjacent one of its ends providing an enlargement at opposite sides of the electrode, said flattened portion having a width slightly greater than the diameter of said recess and adapted to be forced into the recess to provide a binding electrical contact with the walls thereof.

5. In an article of the class described and in combination, a terminal screw having an elongated recess formed therein and having a counter-bore adjacent and surrounding the open end of said recess, and an electrode of slightly less diameter than the diameter of said recess and having a transversely flattened portion adjacent one of its ends providing an enlargement extending laterally at opposite sides of the electrode, said flattened portion having a width slightly greater than the diameter of said recess and adapted to be forced into the recess to provide a binding electrical contact with the walls thereof.

6. In an article of the class described, and in combination, a terminal screw having an elongated recess formed therein and having a tapered counter-bore adjacent and surrounding the open end of said recess, and an electrode of slightly less diameter than the diameter of said recess and having a transversely flattened portion adjacent and spaced inwardly from one of its ends providing an enlargement extending laterally at opposite sides of the electrode, said flattened portion having a width slightly greater than the diameter of said recess, and adapted to be forced into the recess to provide a binding electrical contact with the walls thereof.

7. In a spark plug, a core of insulating material having an elongated opening formed therein and having a socket adjacent one end thereof communicating with said opening, a terminal member having a recess formed therein positioned in said socket in spaced relation to the inner end thereof and in a manner to provide a chamber in said core adjacent one end of said opening, an electrode in said opening and having an enlarged portion adjacent one of its ends positioned in said recess in binding electrical contact with the walls thereof, and a second enlarged portion on said electrode positioned in said chamber.

8. In a spark plug, a core of insulating material having an elongated opening formed therein and having a screw-threaded socket adjacent one end thereof communicating with said opening, a screw-treaded terminal member having a recess formed therein positioned in said socket in spaced relation to the inner end thereof and in a manner to provide a chamber in said core adjacent one end of said opening, an elongated electrode in said opening extending beyond the ends thereof and having an enlarged portion adjacent one of its ends positioned in said recess in binding electrical contact with the walls thereof, and a second enlarged portion on said electrode positioned in said chamber.

9. In a spark plug, a core of insulating material having an elongated opening formed therein and having a screw-threaded socket adjacent one end thereof communicating with said opening, a terminal member having a recess formed therein adjacent one end portion thereof, screw threads on said end portion of the member and engaging the threads of said socket, a laterally extending flange on said terminal member engageable with one end of said core for spacing the recessed end portion of the member from the inner end of said socket to provide a chamber in the core adjacent one end of said opening, an elongated electrode in said opening extending beyond the ends thereof and having an enlarged portion adjacent one of its ends positioned in said recess in binding electrical contact with the walls thereof, a second enlarged portion of said electrode positioned in said chamber, and a cementitious sealing material in said chamber and opening adjacent the portions of the electrode therein.

10. In a spark plug, a core of insulating material having an elongated opening formed therein and having a socket adjacent one end thereof communicating with said opening, a terminal member having a recess formed therein positioned in said socket in spaced relation to the inner end thereof in a manner to provide a chamber in said core adjacent one end of said opening, an electrode in said opening and having a flattened portion providing an enlargement adjacent one of its ends of slightly greater width than the diameter of said recess and adapted to be positioned in the recess in binding electrical contact with the walls thereof, and a second flattened portion on said electrode providing an enlargement positioned in said chamber, said second enlargement being of greater width than said first-mentioned enlargement and spaced inwardly therefrom.

11. In an article of the class described and in combination, a terminal member having a recess formed therein, an electrode of substantially uniform cross section throughout a major portion of its length and adapted to loosely engage said recess, said electrode having an enlarged portion adjacent one of its ends adapted to be adjustably positioned within said recess and in binding engagement with the walls thereof.

12. In an article of the class described and in combination, a terminal member having a recess formed therein, an electrode of substantially uniform cross section throughout a major portion of its length and adapted to loosely engage said recess, said electrode having a flattened portion of greater width than the major portion of the electrode and adapted to be adjustably positioned in said recess in binding electrical engagement with the walls thereof, the ends of said flattened portion being rounded to facilitate longitudinal adjustment of the electrode relative to said recess.

13. The method of assembling an electrode having an enlarged portion adjacent one of its ends with a recessed terminal and an axial bored insulating core, which consists in forcing the enlarged portion of said electrode into said recess in binding engagement with the walls thereof, projecting a portion of the electrode through the insulating core, and fixedly securing the terminal to one end of said core with a portion of the electrode extending from and beyond the opposite end of the core.

14. The method of assembling an electrode having an enlarged portion adjacent one of its ends with a recessed terminal and an axially bored insulating core, which consists in forcing the enlarged portion of said electrode into said recess in binding engagement with the walls thereof, projecting a portion of the electrode through the insulating core, fixedly securing the terminal to one end of said core with a portion of the electrode extending from and beyond the opposite end of the core, and thereafter adjusting the electrode longitudinally relative to said recess by a force exerted on the extended end portion of said electrode.

EARL E. BIDWELL.